United States Patent [19]
Gunther

[11] Patent Number: 5,844,209
[45] Date of Patent: Dec. 1, 1998

[54] APPARATUS TO CONTROL THE COOKING TEMPERATURE OF FOODS

[76] Inventor: Arnold Gunther, 29 Lorelei Rd., West Orange, N.J. 07052

[21] Appl. No.: 20,427

[22] Filed: Feb. 9, 1998

[51] Int. Cl.[6] ....................................................... H05B 1/02
[52] U.S. Cl. .......................... 219/506; 219/501; 219/519; 219/413; 361/161; 361/165
[58] Field of Search ........................... 219/712, 411–413, 219/519, 518, 494, 508, 511, 501; 361/161, 164, 165

[56] References Cited

U.S. PATENT DOCUMENTS

| | | | |
|---|---|---|---|
| 2,070,491 | 2/1937 | Park | 219/519 |
| 2,592,525 | 4/1952 | Huck | 219/519 |
| 2,784,288 | 3/1957 | Moran et al. | 219/519 |
| 3,069,087 | 12/1962 | Thomas | 236/15 |
| 4,240,055 | 12/1980 | Shimizu et al. | 335/234 |
| 4,467,163 | 8/1984 | Pauly et al. | 219/712 |

Primary Examiner—Mark H. Paschall

[57] ABSTRACT

Apparatus for control of cooking foods temperature by sensing their temperature with thermistors, which form part of a first electrical circuit that induces a magnetic flux in an electromagnet, a second electrical circuit that induces, in the electromagnet, a flux of opposite direction to the former, the resultant flux (larger flux minus smaller flux) generating a magnetic pull on the electromagnet's armature.

The armature is linked to an on/off switch that forms part of a third electrical circuit that contains an alarm.

Spring actuated forces on the armature oppose the magnetic pull. Increase in food temperature brings an increase of current intensity in the first circuit, which causes the magnetic pull to decrease.

At the pre-selected controlled temperature of the food, the magnetic pull is slightly smaller than the opposed springs forces. At this point the armature separates from the core, putting the third circuit's switch on and activating the alarm.

4 Claims, 1 Drawing Sheet

APPARATUS TO CONTROL THE COOKING TEMPERATURE OF FOODS

BACKGROUND OF THE INVENTION

Foods such as raw meat and poultry may reach the consuming public contaminated with bacteria, such as salmonella, that could cause sickness and even death.

One way to destroy the harmful bacteria consists of heating the food to a certain minimum temperature.

For meats, for example, the recommended minimum temperature is 160 degree Fahrenheit. To attain this result, a simple way is to insert an indicating thermometer's bulb into the food being cooked and keep reading the temperature scale till the desired one is reached. This requires a person's attention during the cooking time. It would entail a waste of valuable time.

As a general rule, the longer the person's attention span, the more inaccurate is the reading of the desired temperature. As a consequence the food may be over or undercooked. Overcooking, in the case of meats, impair its taste. On the other hand, undercooking may leave active toxic bacteria with its attended consequences.

Prior art involves indicating thermometers of various types such as liquid filled, gas filled, thermocouples, bimetallic, etc., that are well known in the art.

BRIEF SUMMARY OF THE INVENTION

The apparatus of the present invention, has, as one of its components, a temperature sensing element which is in thermal contact with the food being heated.

This temperature sensing element has the property of decreasing its electrical resistivity with increasing temperature. These elements are known as thermistors.

A thermistor forms part of an electrical circuit that energizes an electromagnet by circulating a current through a set of coils located on its iron core.

A convenient source of electricity, such as a battery, forms part of the electrical circuit and provides the voltage drop through it.

As the thermistor temperature raises, its electrical resistivity decreases.

Consequently, the current intensity through the circuit increases, which in turn increases the magnetic flux through the electromagnet's core.

Another set of coils, located on the same core, are part of a second electrical circuit, distinct and independent from the one containing the thermistor.

The second set of coils have their spires wound in an opposite sense to the spires of the first set.

Current circulating through the second circuit will induce a magnetic flux of opposite direction to the first one, thus tending to cancel each other.

The electromagnet's armature is linked to an on/off switch. This switch is part of a third electrical circuit that contains an audio and/or visual alarm.

The magnetic pull exerted over the armature by the magnetized core is opposed by a force, which may be provided by springs or other convenient means, such as the armature's own weight.

The operation of the apparatus of the present invention is now briefly described. As the food raises its temperature, the temperature of the thermistor in contact with the food follows closely.

The current intensity flowing in the first circuit, which contains the thermistor, increases as the thermistor temperature increases. The absolute value of the induced magnetic flux also increases. The path taken by this flux through the core and armature is opposite to the path taken by the flux generated by the second electrical circuit. The resultant flux, which is equal to the difference of both, decreases in absolute value as the food temperature raises. It follows that the magnetic pull on the armature decreases as the food gets hotter.

As soon as the magnetic pull on the armature is smaller than the before mentioned opposing force, the armature separates from the core. This causes the on/off switch to close the third circuit, thereby activating the alarm and signaling that the food temperature has reached the desired level.

Although the prior description is directed to food's single point temperature control, the apparatus of this invention can also control a range of temperatures, as it will be shown in the detailed description of the invention.

It is also evident that the control means provided by the third circuit can be applied for other purposes than visual or audio alarm. For example, a food heating control device could close a fuel supply line to the heating device at a pre-selected temperature, thereby ending the heating of the food.

A practical realization of the aforesaid control can be attained by installing in the fuel line a solenoid valve and making this valve part of the third electrical circuit. The valve would be normally open when no current flows through the solenoid. When the food reaches a pre-selected control temperature the on/off switch closes the circuit, energizing the solenoid and closing the fuel valve, thus ending the heating of the food.

DETAILED DESCRIPTION OF THE INVENTION

Figure 1:
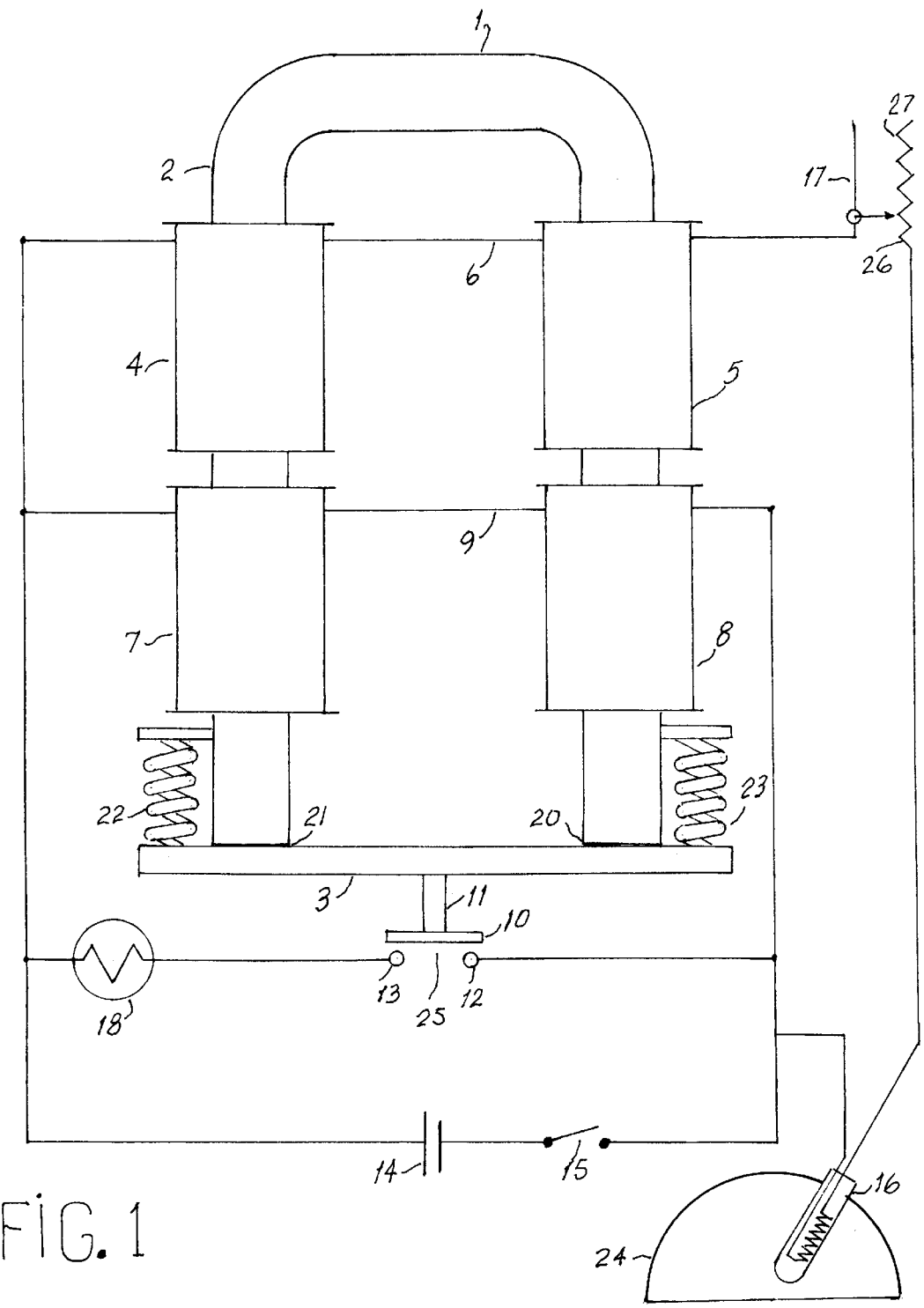
FIG. 1 is a schematic view of a preferred embodiment of an apparatus according to this invention.

Reference is made to FIG. 1.

Numeral 1 denotes an electromagnet which comprises: an iron core 2, an iron armature 3, a set of coils 4 and 5 which are electrically linked by wire 6, another set of coils 7 and 8 electrically linked by wire 9.

Numeral 10 indicates a metallic strip attached to armature 3 by an insulated rod 11.

Terminals 12 and 13, together with strip 10 constitute a single throw, double pole, switch 25.

In what follows, the electrical circuit comprising: the electricity source 14, main switch 15, thermistor 16, rheostat 17, coil 5, wire 6, coil 4 and source 14, shall be named first circuit.

Another electrical circuit, named second circuit, comprises: source 14, switch 15, coil 8, wire 9, coil 7 and source 14.

Still another electrical circuit, named third circuit, comprises: source 14, switch 15, terminal 12, strip 10, terminal 13, alarm 18 and source 14.

The alarm 18 can be a visual one such as red light bulb, an audible one such as a ringing bell or an electrically actuated control device that operates on the heat source for the food, such as a solenoid valve.

Thermistors, which are the temperature sensing elements used in this invention, are made of solid semiconductors materials.

Semiconductors electrical conductivity increases with their temperature, which is contrary to the behavior of metals. The latter's conductivity decreases with temperature.

Because resistivity is the inverse of conductivity, it follows that for semiconductors the resistivity decreases with temperature, while it increases for metals.

The rate of resistivity change with temperature is, in general, much greater for thermistors than for metals. For example, platinum resistivity increases about 40% for a temperature increase of 100 degree centigrade while thermistors, with a resistivity decrease of 5000% for 100 degree increase, are available.

Among the semiconducting materials of which the thermistors are made, are a number of metal oxides and their mixtures, such as oxides of cobalt, copper, nickel, zinc, etc. The oxides, usually compressed into the desired shapes from powders, are heat treated to recristallize them, resulting in dense ceramic bodies.

Electric contacts are made by various means, such as wires embedded before firing the material and other techniques. Forms are available in beads as small as 0.015 inches in diameter, which can be glass coated. Rods and discs are other common shapes available.

The temperature coefficient, defined as the fractional change of resistivity per degree centigrade increase, can be many times greater for thermistors than for metals.

For example, platinum has a coefficient of +0.004 ohms/ohm/degree C over a wide temperature range, while thermistors with a coefficient −0.01 to −0.05, at room temperatures, are commercially available.

Generally, the absolute value of the temperature coefficient decreases with temperature, and at about 150 degree C their value is reduced to about half; 0.005 to 0.025. Thus, the sensitivity is greatly increased when using thermistors in lieu of metals as temperature sensing elements.

The relatively small size of thermistors is associated with a small heat capacity.

Thus the thermistor follows the measured temperature with a relatively small time delay.

On the other hand, the small thermal capacity will cause a relatively high temperature increase due to the Joule effect [heat generation by electricity flowing through a resistance].

In order to dissipate the heat so generated the thermistor temperature has to be somehow above the temperature of the medium in which it is immersed.

This temperature differential, usually designated as "delta t", is taken into account when the apparatus calibration is made.

For small size thermistors, such as beads having a diameter around 0.1 inch, the heat dissipation rate is of the order of a few miliwatts per degree C, it will depend on the size of the thermistor and on the media with which it is in contact.

Referring now to the second circuit, when switch 15 is closed, the current that flows through coils 7 and 8 generates a magnetic flux through the iron core 2 and armature 3. The iron core becomes magnetized and magnetic poles appear at its faces 20 and 21. The magnetic flux that traverses these faces and enters the armature generates in it poles of opposite sign. The attractive forces between the pairs of opposite poles pull the armature tightly over the core.

The magnetic flux required to pull the armature increases when an air gap appears between the core and the armature. This, in turn, imposes the requirement of a larger current intensity through coils 7 and 8, which may affect the life of the battery 14, if a battery is used as the electricity source. If this is undesirable the armature may be reset manually.

The magnetic pull, created on the armature by the second circuit, is partially opposed by the compression springs 22 and 23, the resultant forces keeping the armature pressed against the core.

Decrease of the magnetic pull, to a value smaller than the forces exerted by the springs on the armature, will cause the latter to separate from the core. Decrease of the magnetic pull is attained by inducing a magnetic flux of opposite direction to the flux generated by coils 7 and 8. By winding the spires of coils 4 and 5 in an opposite sense to the spires in coils 7 and 8 the fluxes oppose each other.

The current intensity in the second circuit is maintained essentially constant, thus generating a constant flux.

On the other hand, the current intensity in the first circuit is variable and depends on the thermistor 16 temperature.

With the thermistor inserted into the edible medium 24, assumed being heated, its temperature will closely follow the food temperature. During the heating period the ohmic resistance of the thermistor decreases while its temperature raises.

The current intensity through coils 4 and 5, being inversely proportional to the ohmic resistance raises with the temperature of the heated food.

Consequently, the magnetic flux generated by this current also increases. By being subtracted from the constant flux, above mentioned, it decreases the magnetic pull on the armature. As soon as this pull is equal or smaller than the springs's push on the armature, the latter will separate from the core. This causes strip 10 to contact terminals 12 and 13, thereby activating the third circuit and setting alarm 18 on.

The separation of the armature, activation of the third circuit and setting the alarm on, occur for a certain temperature of the heated food.

The calibration of the apparatus is such that, when the food temperature reaches the desired one, the above mentioned events occur.

Having described single temperature control, the description of control for a range of temperatures follows.

The activation of the alarm at any desired temperature, within the selected control range, requires the separation of the armature from the core.

In turn, this requires that the magnetic pull, at any temperature within the range, be the same. The magnetic pull depends on the magnetic fluxes generated by the first and second circuits. Consequently the fluxes are to be the same at any temperature within the range.

Constant fluxes require constant current intensities through first and second circuits. In particular, constancy of current intensity in first circuit requires constant ohmic resistance for the controlled temperature range (the voltage of source 14 is essentially constant).

The ohmic resistance of first circuit is, substantially, the sum of the thermistor 16, coils 4 and 5, and rheostat 17, resistances.

The thermistor resistance decreases with temperature, and, in order to keep the total resistance constant, the rheostat resistance has to increase.

At the lowest temperature of the controlled range, the rheostat is at its minimum resistance, indicated by numeral 26. Numeral 27 indicates its resistance for the highest temperature of the range.

It should be noted that if a single temperature, not a range, is to be controlled, the rheostat may be dispensed with. In this case the thermistor is connected directly to coil 5.

I claim:

1. An apparatus to control the cooking temperature of foods, comprising; a thermistor for sensing the temperature of the food, said thermistor in intimate contact with said food, an electromagnet, a first set of wire spires coiled over the electromagnet's iron core, a second set of wire spires coiled over the electromagnet's iron core, with said first and second sets of wire spires coiled in opposite sense, an iron armature, a first electrical circuit consisting of an electrical power source connected in series to said first set of spires and switching means, whereupon operation of said switching means causes current to flow in said first circuit, said current flow being substantially constant, thereby generating a substantially constant magnetic flux through the core and the armature, said magnetic flux causing attractive magnetic forces between the core and the armature, springs applied to said armature and exerting forces partially opposed to said attractive magnetic forces, a second electrical circuit consisting of said thermistor connected, in series, to said second set of spires, a power source and a rheostat, said thermistor having a negative coefficient of resistance, its resistance decreasing when the food temperature increases, whereupon the current flowing through said second circuit increases, causing an increasing magnetic flux through the core and armature, said increasing magnetic flux being in the opposite direction to said constant magnetic flux in said first circuit, thereby decreasing the attractive magnetic force on the armature and causing its separation from the core when said force, for a desired control temperature of the food, becomes smaller than the opposing force exerted by said springs, a third electrical circuit comprising, in series, a power source, alarm means and a switch cooperating with the armature, said switch becoming operative upon separation of the armature from the core, whereupon said third circuit is energized and the alarm means are activated, said alarm means being activated for differing food control temperatures by operating on the variable resistance of said rheostat.

2. An apparatus as claimed in claim 1, in which the alarm means is an electrically actuated visual alarm.

3. An apparatus as claimed in claim 1, in which the alarm means is an electrically actuated audible alarm.

4. An apparatus as claimed in claim 1, in which the alarm means is an electrically actuated device to control the heating of the food.

* * * * *